United States Patent [19]

Bucaro et al.

[11] Patent Number: 5,642,445

[45] Date of Patent: Jun. 24, 1997

[54] SYSTEM FOR DETERMINING AN INTERIOR OR EXTERIOR ACOUSTIC NOISE LEVEL OF AN ENCLOSED STRUCTURE AND NOISE REDUCTION DEVICE INCORPORATING SUCH SYSTEM

[75] Inventors: Joseph A. Bucaro, Herndon; Brian H. Houston, Fairfax, both of Va.; Anthony J. Romano, Washington, D.C.

[73] Assignee: The United States of America as represented by the Secretary of the Navy, Washington, D.C.

[21] Appl. No.: 551,081

[22] Filed: Oct. 31, 1995

[51] Int. Cl.[6] .................................................. G01S 3/808
[52] U.S. Cl. ............................. 385/12; 181/125; 181/175; 367/13; 367/124
[58] Field of Search ........................... 385/7, 12, 13, 385/15, 24, 27; 367/1, 2, 6, 13, 118, 124, 129, 131, 134, 135, 140, 141, 153, 191, 907; 381/71; 181/0.5, 125, 175

[56] References Cited

U.S. PATENT DOCUMENTS

| 5,047,990 | 9/1991 | Gafos et al. | 367/6 |
| 5,347,496 | 9/1994 | Clark et al. | 367/140 |
| 5,410,607 | 4/1995 | Mason et al. | 381/71 |
| 5,493,540 | 2/1996 | Straus et al. | 367/135 |

*Primary Examiner*—John D. Lee
*Attorney, Agent, or Firm*—Thomas E. McDonnell; George Jameson

[57] ABSTRACT

The acoustic noise monitor determines acoustic sound levels radiated or scattered to an exterior or interior fluid space of a structure such as an enclosed structure by measuring a condition, such as strain level, of the structure itself rather than by directly measuring the fluid itself. From the strain or other condition measured on the structure, the acoustic sound levels can be calculated with the Helmholtz integral. The sensors on the structure are preferably spaced so that non-radiating high wave-number motions of the structure are averaged out. The acoustic noise monitor can be used with submarines, jet aircraft, cars, or the like.

21 Claims, 5 Drawing Sheets

5,642,445

SYSTEM FOR DETERMINING AN INTERIOR OR EXTERIOR ACOUSTIC NOISE LEVEL OF AN ENCLOSED STRUCTURE AND NOISE REDUCTION DEVICE INCORPORATING SUCH SYSTEM

BACKGROUND OF THE INVENTION

1. Field of the Invention

The present invention is directed to a system for determining an acoustic sound level interior or exterior to an enclosed structure.

2. Description of the Prior Art

It is known that an interior pressure of a pressurized container can be calculated from measuring the displacement of a surface of the container. U.S. Pat. No. 3,882,718 to Kriebel teaches the application of this technique to pressure measurement in an eyeball to test for glaucoma.

It is also known that fiber optic interferometry can be used to sense the acceleration of fluid waves, as taught by U.S. Pat. No. 4,799,752 to Carome. It is further known that a grid of optical fibers can detect a distribution of strain on the grid, as taught by U.S. Pat. No. 4,781,056 to Noel et al.

However, heretofore there has been no system capable of obtaining a detailed mapping, or even an accurate single point or regional measurement, of the acoustic field in a fluid space exterior/interior to an enclosure based only on a condition, such as structural strain levels, of the structure itself.

SUMMARY OF THE INVENTION

It is an object of the invention to provide a system for determining a sound level at a point in an interior or exterior fluid space of an enclosed structure based on a condition of the structure. The invention provides for determination of the acoustic sound levels radiated or scattered to the exterior/interior fluid space of an enclosed structure (vehicle) without the need to perform measurements in the fluid itself but rather using only measurements on the structure.

To this end, the present invention, in one embodiment, is directed to a system which uses strain sensors such as line-integrating fiber optic strain sensors to measure the strain being applied to the structure: When correctly arranged, the strain sensors spatially average to near zero any contaminating high wave-number structural motions which do not radiate but which when present can dominate the structural strain levels rendering useless single-point sensors. The outputs of the strain sensors can be processed in a manner described in detail below in order to obtain the three components of integrated strain or in simplified situations, those strain components which couple to the acoustic field. The processed outputs of the strain sensors can be further processed by a "Helmholtz"-based operator to convert the outputs into sound pressure levels at the desired locations in the interior/exterior of the enclosure. The strain sensors can be implemented in a practical high sensor count configuration using optical multiplexing/demultiplexing systems.

Such a system has a number of widespread applications. These include, but are not limited to, the following. (1) One such system enables the monitoring of a submarine's radiated or scattered acoustic signals as they would actually appear at a distant enemy sonar system. (2) Another system assesses the spatial/spectral details of the acoustic noise fields to be controlled by passive or active means. This includes both the exterior acoustic noise (such as in the submarine application) and the interior acoustic noise (such as in interior aircraft cabin noise). The information presented by such a system would allow the development and implementation of optimum acoustic noise reduction systems. (3) In certain aircraft, a system can be provided for measuring exterior noise for assessing in a simple on-board manner compliance with environmental noise regulations. (4) Such a sensor system could be used in whole or in part as the actual sensors in an active acoustic noise reduction system.

The invention is concerned primarily with dynamic strain and dynamic pressure. However, it could also be used with static strain and static pressure (limit as $\omega \to o$).

BRIEF DESCRIPTION OF THE DRAWINGS

The invention will now be described in greater detail with reference to the drawings, in which.

DETAILED DESCRIPTION OF THE EMBODIMENT

The present invention is applicable to determining the detailed interior and exterior dynamic acoustic maps associated with enclosed structures. The present invention can be implemented with any of the currently existing fiber optic strain sensing technologies such as single mode fiber interferometers, dual-mode fiber interferometers, and interferometric in-fiber grating sensor technologies. Each of these fiber sensors is required to monitor the line-integrated structural strain in the direction (locally) of the fiber line. The specific manipulations of sensor data are performed on a general-purpose computer (GPC) for non-real time applications or a dedicated custom computer for real time or pseudo-real time implementations. The selection of the general purpose computer type is not critical, as the processing and data acquisition requirements are sufficiently moderate that many different types of machines and configurations can be used to implement this system.

Figure 1:
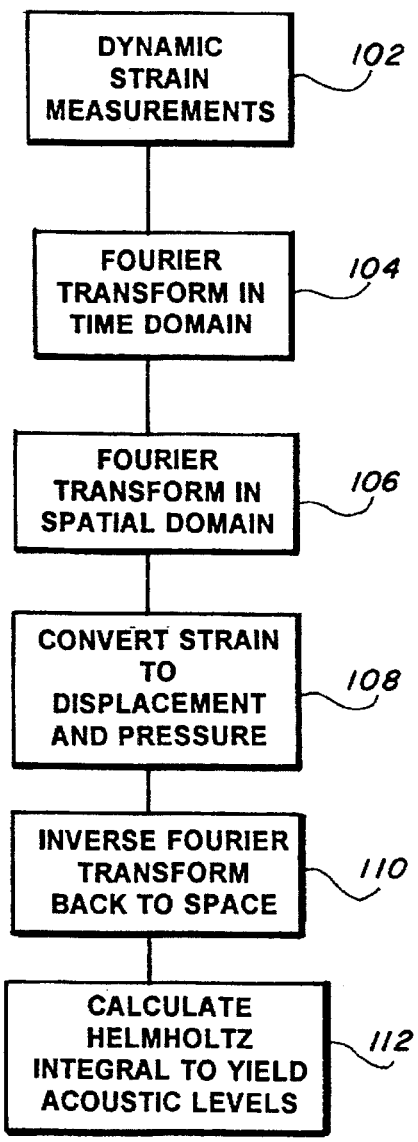
FIG. 1 shows a flow chart illustrating an operation of the invention.

The invention will be explained with respect to the flow chart of FIG. 1. With line-integrating sensors, various orientations and distributions of fiber-optic "segments" attached to a vibrating structure can measure dynamic strain (step 102) and thus lead to a tractable means for the determination of the surface displacements and surface pressure on the structure (step 108). This can be performed by situating and processing the information from the segments in such a way that their corresponding analytical relationships between phase shift, strain, displacement ($\vec{s}$), and path orientation permit a unique separation into vector displacement components ($\vec{s}(r,\theta,z)=<w,v,u>$ in appropriate coordinates) by way of temporal and spatial Fourier transforms (steps 104 and 106). With a knowledge of these displacement components and the boundary conditions, the surface pressure, $P(a,\theta,z)$, can be reconstructed, and the resulting radiated or scattered pressure field at a location $\vec{r}$ can be determined through the invocation of the well-known Helmholtz integral (step 112), i.e. where G is the free space Green's function, and the integral is over the surface $S_0$ of the vibrating structure.

$$P(\vec{r}) = \int_{S_0} (P(a,\theta,z)\vec{n} \cdot \nabla G(\vec{r},\vec{r_0}) - G(\vec{r},\vec{r_0})\vec{n} \cdot (\omega^2\rho)\vec{s}(a,\theta z))dS \quad (1)$$

Figure 2:
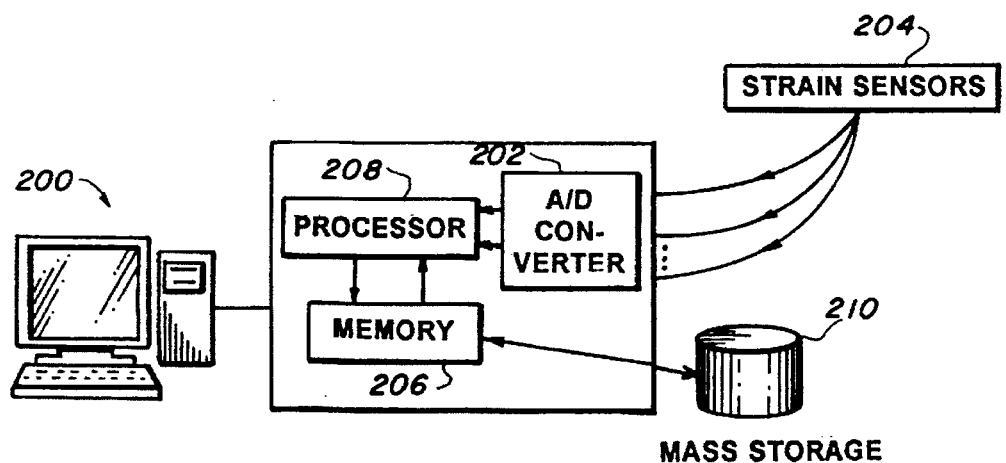
FIG. 2 shows an implementation of the invention in a general-purpose computer.

The structure of interest is instrumented with an array of fiber-optic strain sensors such as, in the case of a physical system which has been constructed, an array of 16 "hoop" sensors that are placed at specific axial locations down the length of a submarine hull. These sensors form a major subsystem of the overall system. In most applications of this invention, the fiber-optic sensor can be replaced with other motion sensing devices such as accelerometers; the use of a fiber-optic strain sensor is not a necessary condition. As shown in FIG. 2, a general purpose computer (GPC) 200 such as a micro VAX 4000 interfaced with sufficient channels of analog-to-digital converters (A/D) 202, of sufficient speed and memory to capture the strain response output of each sensor 204 on the shell as a result of the insonification excitation, forms the second subsystem of the overall system. These transient responses are all collected in a coherent fashion and stored in random access memory (RAM) 206 of the GPC. The data are then transferred by processor 208 to a mass storage unit 210 for semi-permanent storage. These data are written in any array format.

The GPC is first used to convert the strain information into displacement and pressure (step 108). This is done by reading the strain data into RAM memory 206 on the GPC and performing an algebraic conversion at processor 208 of strain into displacement and pressure (step 108). For the system constructed, the conversion was a simple multiplication of the strain data by a constant factor to yield displacement and was accomplished on the micro VAX-4000. In applications where strain sensors are not used, the state of mechanical motion measured (for example, acceleration) must be converted into displacement. The result is held in core RAM 206 in preparation for the next part of the system implementation. The next stage of the system requires that the displacement transient responses now be Fourier transformed to yield the frequency domain response of the sensors.

The sensor responses are Fourier transformed using a Digital Fourier Transform (DFT) which is commonly found in the industry and, as such, is a basic tool. The DFT is resident in memory 206 as an executable code having been loaded from a mass storage device 210. Transforms are taken in the time-domain to yield the frequency domain displacement responses 104. The resulting array is held in memory 206 for the next stage of the system implementation. The next stage of the system implementation requires that a spatial Fourier transform be computed on the above array result (step 106).

The above-computed frequency-domain responses are then Fourier transformed (step 106) using a Digital Fourier Transform. The DFT is resident in memory 206 as an executable code having been loaded from a mass storage device 210. Transforms are taken (step 106) in the spatial-domain to yield the wave-number domain displacement responses. The resulting array is held in memory 206 for the next stage of the system implementation. The next stage of the system implementation requires the conversion from strain to displacement and pressure (step 108), an inverse transformation back to space (step 110) and a properly discretized Helmholtz integral computation on the above result (step 112).

The above elements of the system have produced sensor data that have been decomposed into the wave number-frequency domain and, as such, constitute a common mathematical space for structural acoustic manipulations. A routine is executed at this stage of the implementation that takes the above array and computes a properly discretized Helmholtz surface integral. This is easily accomplished by someone skilled in the art who has reviewed this specification. The result is a prediction in the form of an array of acoustic pressures as a function of frequency or time at previously determined positions in three-space. These results are transferred from RAM memory 206 to the hard disk mass storage device 210 for a more permanent storage.

Figure 3:
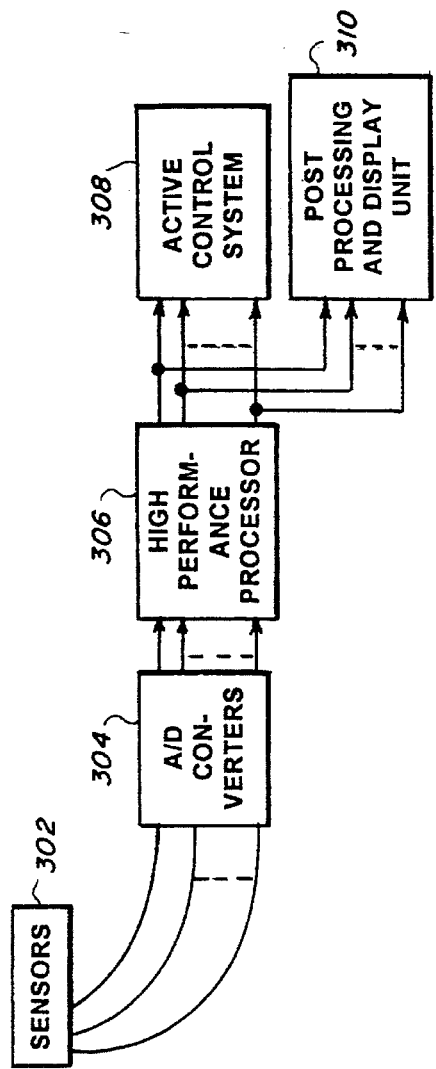
FIG. 3 shows an implementation of the invention for real-time use.

The process for real-time implementation is nearly identical to that implemented using a General Purpose Computer. The strain sensor sub-system is identical for either case. In real time implementations, as shown in FIG. 3, the data from sensors 302 are streamed in through an array of analog-to-digital converters 304, and the processing steps indicated for the GPC implementation are accomplished with a custom high performance digital signal processor (DSP) 306 made up of, for example, Mercury Computer Systems, Inc. model MC 860 processor boards with the results fed directly to an active control system 308 or to a post processing and display unit 310, such as a Silicon Graphics Inc. model INDIGO computer.

Figure 4:
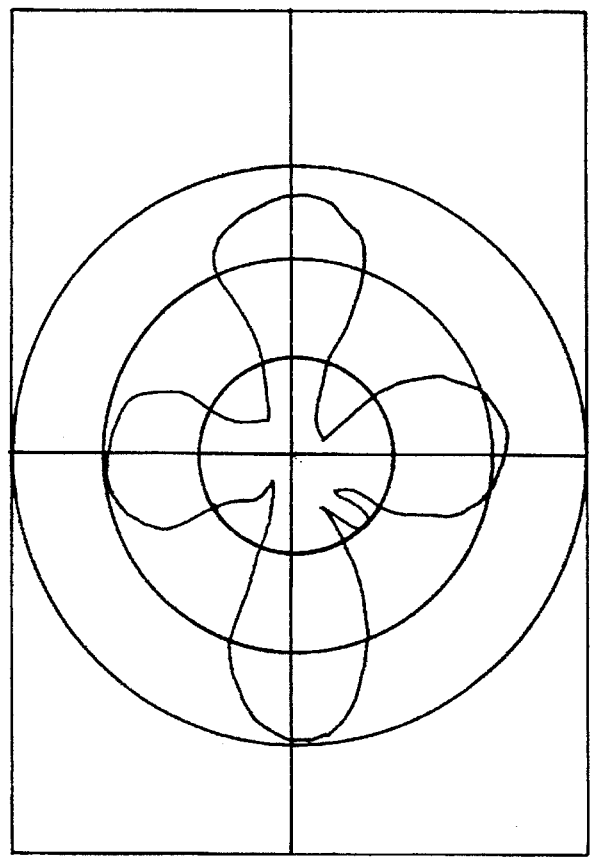
FIG. 4 shows an output of a beam pattern obtained in accordance with the invention.

The output of this sensor/processing system is a mapping of dynamic acoustic pressures on the exterior or interior of an enclosed structure. Some of the most useful displays of results are the generation of so called "beam patterns" at specific frequencies of the in-plane or out-of-plane magnitude (expressed in units of 20 log(P)) as a function of angle. An example of a beam pattern is shown in FIG. 4. For example, the scattering cross-section or target strength of a submarine in the horizontal plane can be displayed in these polar coordinates where the angle is relative to the target bow and sweeps out a full 360 degrees about the target. Responses in other planes can also be displayed such as the response in the vertical plane. Another type of display is one where the scattering or radiated amplitudes determined from this invention are displayed with a color or gray scale graphic where the angle is plotted on one axis, the frequency or time are plotted on another perpendicular axis, and the acoustic response is plotted using a color scale or gray scale.

The output of the invention can be coupled to environmental and spatial mode models to increase the fidelity of the prediction of a submarine's vulnerability. The refraction of acoustic energy propagating in the ocean is caused by the changing temperature and salinity primarily as a function of depth. During naval operations, data are collected on the appropriate physical state of the water and, together with a knowledge of the ocean bottom profile, can be used to accurately predict the propagation of sound from one spatial point to the next. A logical extension of this invention is to interface it with an environmental modeling capability to increase the accuracy of the prediction of a submarine's acoustic signature at an enemy's location.

Figure 5:
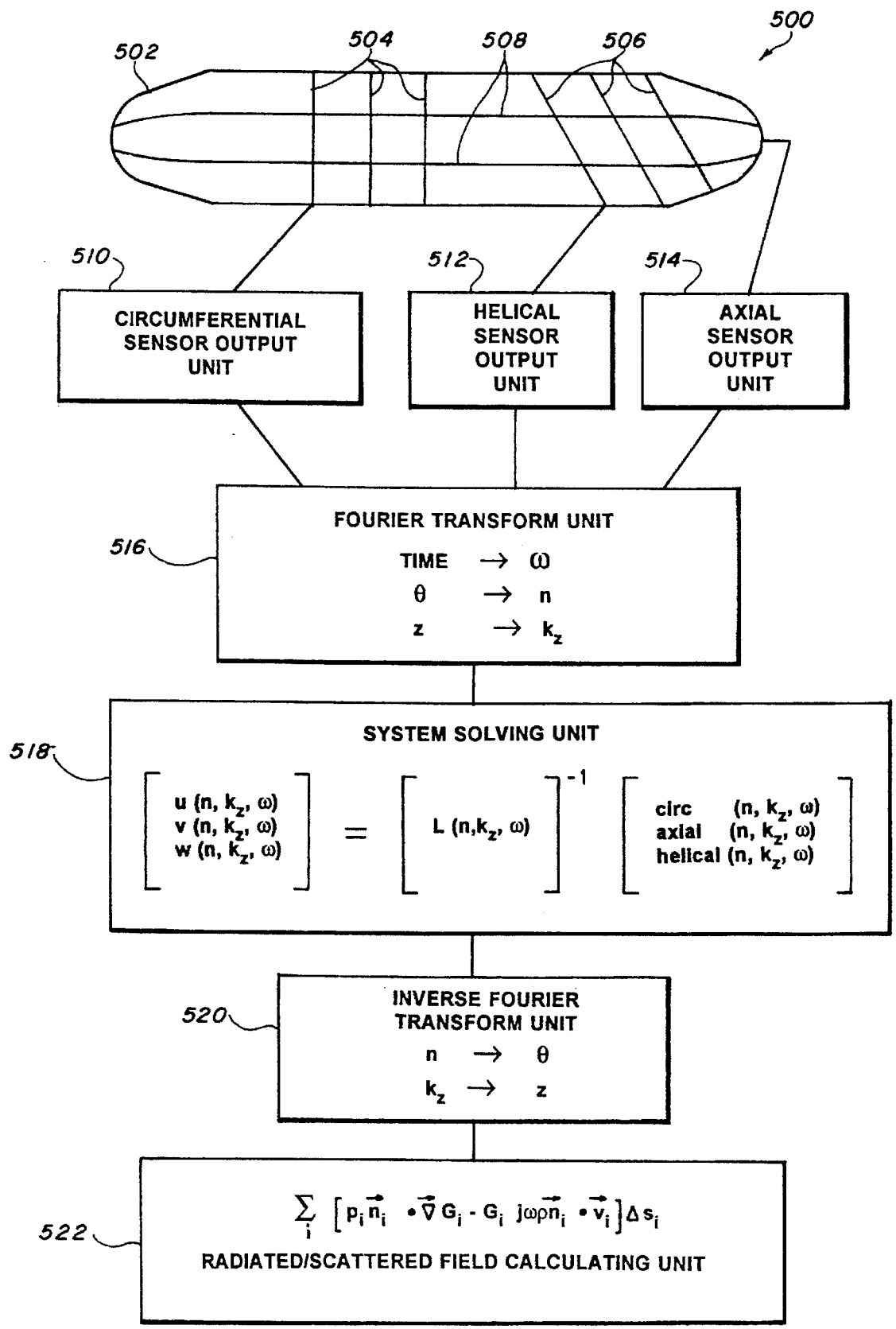
FIG. 5 shows a schematic block diagram of a system according to the invention.

FIG. 5 shows one possible segmented fiber optic sensor distribution, in which circumferential, axial and helical segments coincide at axial and circumferential intervals determined by spatial Nyquist sampling criteria. For example, such an axial interval ($\Delta z$) is determined by the general requirement that $\alpha z \leq \lambda_{min}/8$ where $\lambda_{min}$ is the smallest structural wavelength occurring within the required frequency range. Correspondingly, the number of circumferential intervals is related to twice the highest circumferential harmonic significantly present.

With this distribution criteria established and the analytical relationships between the displacement of the structure, the fiber orientation, and the resultant phase shift measured by each segment, temporal and spatial Fourier transforms are invoked, and the three displacement components can be determined by solving a system of three equations (whose transformed operator is represented in FIG. 5 as $L(n,k_z,\omega)$).

The surface pressure can be determined from the boundary conditions, and this information can be inserted into the discrete form of Eq. (1) as $$P(\vec{r}) = \sum_i \sum_j (P(a,\theta_i,z_j)\vec{n} \cdot \nabla G(\vec{r},\vec{r}_{i,j}) - G(\vec{r},\vec{r}_{i,j})\vec{n} \cdot (\omega^2 \rho)\vec{s}(a,\theta_i,z_j)) \quad (2)$$

In system 500 shown in FIG. 5, enclosed structure 502 is provided with circumferential fiber optic sensors 504, helical fiber optic sensors 506 and axial fiber optic sensors 508 (shown incompletely for clarity).

The phase shifts are output by circumferential sensor output 510, helical sensor output 512 and axial sensor output 514 to Fourier transform unit 516 which performs temporal and spatial Fourier transforms on the phase shifts. System solving unit 518 obtains the three displacement components and the inverse Fourier transform unit 520 transforms these components back to angle and space co-ordinates and outputs them to surface pressure calculating unit 522 which calculates P(r) in accordance with Eq. (2).

Three examples of such a system are discussed below—a submarine exterior noise monitor, an interior aircraft cabin noise measurement system, and a transport aircraft engine noise radiation monitor.

Figure 6A:
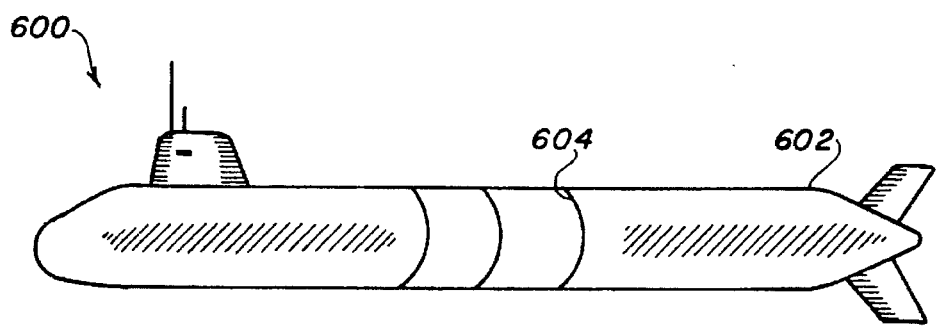
FIGS. 6A and 6B show an implementation of the invention in a submarine.

For the specific case of a submarine hull scattering predictor, or monitor, FIG. 6A shows the following physical situation: submarine 600 under ensonification is instrumented with an array of fiber-optic ring strain sensors 604 attached directly to hull 602 (either inside or outside). Generally speaking, an interferometric sensor is required due to the low strain levels involved. In addition, interferometric systems involving 50 or more sensors have costs that are approximately one-tenth of the costs of conventional sensors. The fiber "rings" are arrayed along the length of the structure at equal spatial intervals established by a Nyquist criteria applied to axial wave-number frequency dispersion curves. The scattering prediction is accomplished through the Helmholtz integral:

$$p = \oint_s \left( p_s \frac{\partial G}{\partial n} - j\omega\rho v_s G \right) ds, \quad (3)$$

where
 p$_s$ is the pressure on the surface of the structure (submarine),
 v$_s$ is the normal velocity on the surface of the structure,
 p is the off-board desired pressure, and
 G is the free-space Green's function.

The physics of the interactions allows for several important simplifications, including the elimination of the pressure term in the Helmholtz Integration because it is a minor contributor for the physical case described here. The integration is simply cast in a discrete format where the velocity terms are derived from the integrated strain response of each ring. In addition, improvements in prediction accuracy can be achieved by the use of a single axial sensing accelerometer on each endcap. Fiber-optic sensors currently offer the highest fidelity in line integrating accuracy out of all strain sensing technologies (i.e. they have low off-axis terms). This is an important component of the invention in that the strain sensor must be a highly accurate integrator, extracting the desired shell motion (wave-number component) out of what is generally a wave-number complex spectrum.

Figure 6B:
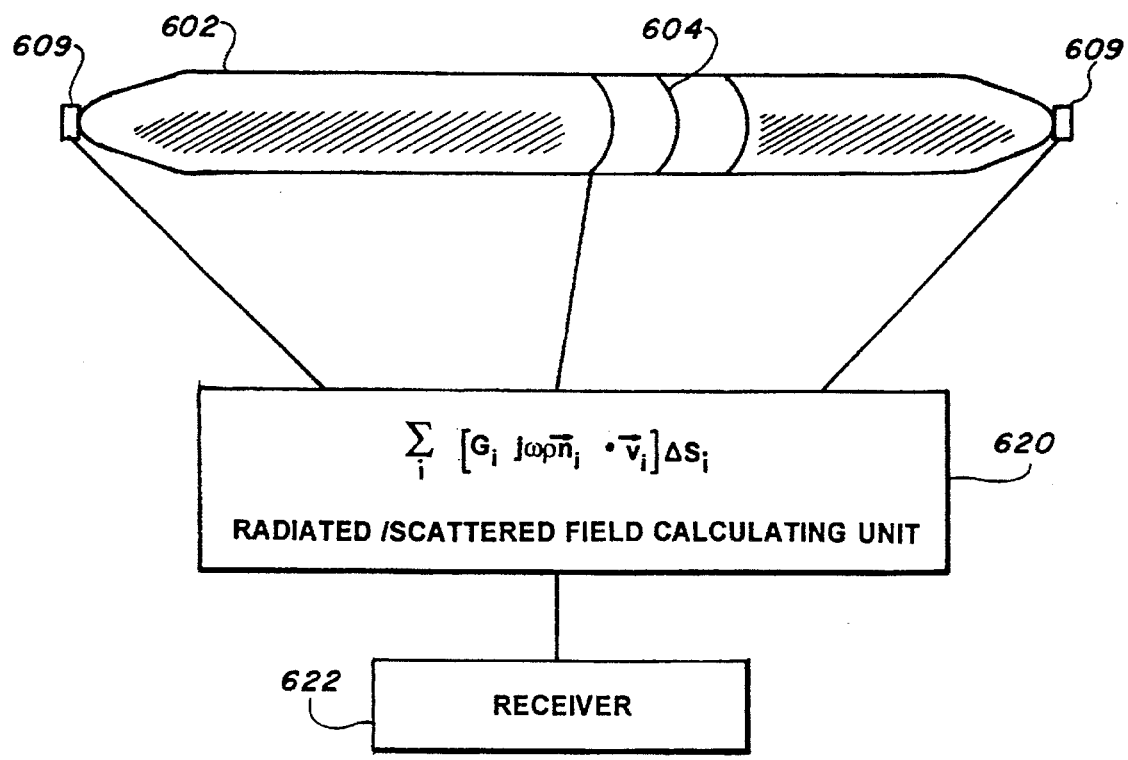

This procedure can be modelled schematically as shown in FIG. 6B. The phase shifts detected by fiber optic ring strain sensors 604 and the outputs of axial sensing accelerometers 609 are output to surface pressure calculating unit 620, which outputs its result to receiver 622. The receiver may display the result or apply it to a noise reduction system. Intermediate components 510, 512, 514, 516, 518, and 520, such as those shown in FIG. 5 are omitted for the sake of clarity.

Figure 7:
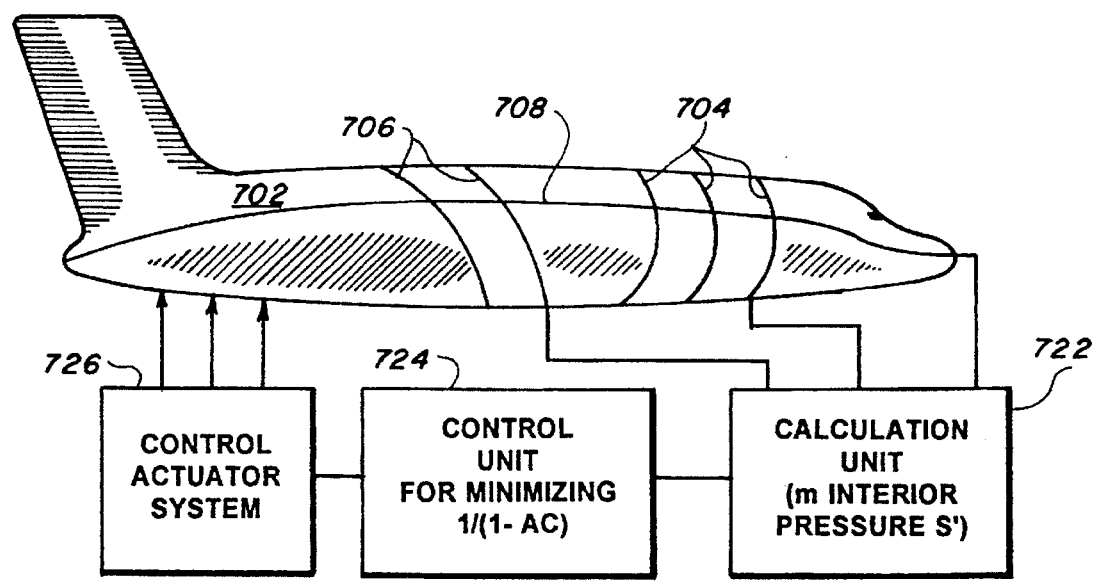
FIG. 7 shows an implementation of the invention in a jet transport aircraft.

The second specific case is that associated with mapping out the complex spatial pressure field of an aircraft interior. The physics associated with the "interior" noise problem of a jet aircraft in flight can be separated into a low frequency part (dominated by energy from power plants etc., coupling into interior spatial modes) and a higher frequency regime, where interior noise levels are primarily attributed to flow induced excitation of the fuselage coupling into the interior spaces. Generally speaking, the lower frequency region has higher sound pressure levels and is therefore the primary spectral region of concern. Acoustic energy enters the interior space and efficiently couples at temporal frequencies where the allowed interior spatial modes have frequencies at or near allowed shell modes. In this physical case, as shown in FIG. 7, interior 702 of aircraft 700 is instrumented with a line integrating sensor array 704, 708 designed to extract specific circumferential and longitudinal modes. Helical sensors 706 can be added as needed. From this, the Helmholtz integral is performed in calculation unit 722 to determine the interior pressure field distribution. In addition to providing essential Information about the interior noise characteristics, the strain sensor system's responses themselves—being directly related by a known propagator to the interior noise spectral and spatial properties—would serve as an ideal input to a controller and actuator system for reducing the interior noise.

For example, the high sound pressure levels on the interior of fixed wing aircraft, at low frequencies, are due to a single mechanism. At specific frequencies, defined by the geometry of the interior, specific spatial modes exist, that when properly coupled to vibrational waves traveling in the skin of the aircraft, lead to large enhancements of the interior standing wave pressure modes. These enhancements in the interior sound levels occur at regions where the flexural wave-numbers and the fluid (air) wave-numbers are the same. Further, they are highest if there is also an allowed spatial mode at those particular frequencies. The general control technique would involve the use of line-integrating strain sensors and the sensor outputs processed (step 108) to recover the three components of dynamic shell displacement and pressure. These outputs can be further processed in the Fourier domain by calculation unit 722 to extract the wave-number and phase-velocity information and thus serve as a detector for the mechanism just discussed. A control unit 724 and control actuator system 726 can be added and used to restructure the vibrational shell modes into other modes that are non-radiating or that do not have a close wave-number match to the fluid pressure, in order to reduce the interior noise, as will now be explained.

The system can be used to treat the interior noise problem of an aircraft by providing "virtual" error sensor inputs to an active control system. The interior noise levels associated with a jet aircraft in flight can be separated into a low frequency part that is dominated by power plants, etc., coupling into the interior, and a high frequency part that is more dominated by flow induced flexural energy coupling into the interior. In both cases, the resulting interior pressure distributions can be determined directly by the above-described invention. An active control cost function can then be imposed that minimizes the interior pressure distributions over a prescribed volume and frequency band.

At a particular frequency, or over a band of frequencies, the control filters are derived in a fashion so as to force a minimization of the acoustic response over the predicted spatial volume. These filters are derived, in a least squares sense, by use of an adaptive LMS algorithm or FIR (Finite Impulse Response) inverse technique that takes m inputs S' derived by calculation unit 722 and generates n outputs in control unit 724 and outputs them to control actuator system 726. Here, A is the controller that minimizes the node value 1(1−AC), where A is an m×n matrix and C is the n×m matrix characterizing the interior response due to the control actuator excitation. In order to solve for a controller A, only the plant response C needs to be known. This is generally achieved by the making of measurements where broadband signals are applied to the actuators one-at-a-time, so the plant matrix C is fully populated with actuators to virtual sensor (S') measurements. The relation I(I−AC)=minimum is used to solve for the controller A. Modern control (State Space) methods are used to create stable and robust controllers. The variability associated with the plant changing with time may require on-line adaptative or remeasuring of C and the periodic updating of the filter A. These technologies, however, are well established.

Figure 8:
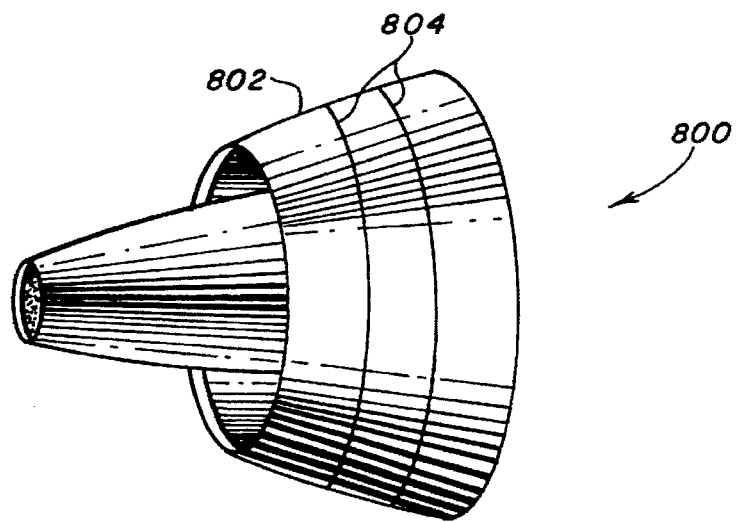
FIG. 8 shows an implementation of the invention in a high-bypass jet engine.

A third example is the application of the technique to monitor and control noise radiation from high-bypass engines on transport aircraft. Such an engine is shown in FIG. 8 in which engine 800 has nacelle 802 with fiber optic strain sensors 804 disposed thereon. Typically, the radiated noise from aircraft can be attributed to three different mechanisms. The first two are forward directed blade noise from the front fan stages in the engine and noise radiated due to side wall motion of the engine nacelle cover. The third is due to noise from the turbulent jet at the exhaust of the engine. Much of the high frequency deterministic noise from the first two mechanisms is theoretically controllable. The techniques of the present invention can be used for determining in flight the radiated noise due to this component including its "far-field" spatial distribution. Again, such a strain sensor system could be ideally used for reducing the side wall motion of the engine nacelle and thus the radiated noise due to this component. The radiated noise from the nacelle results from specific mode shapes on this short cylindrical shape. In a very similar fashion to the submarine application, those wave-numbers could be sampled by the proper distribution of fiber-optic strain sensors and post processing. The outputs of the fiber optic strain sensors would serve as an input to a controller and actuator system with the intended physical control law being to stop side wall motion or restructure the motion to a non-radiating wave-number.

As those skilled in the art who have reviewed this application will readily appreciate, the present invention has many other uses. The present invention serves a need, not met in the prior art, to obtain a detailed mapping—or even an accurate single point or regional measurement—of the acoustic field in a fluid space exterior/interior to an enclosure based only on measurements of a condition, such as strain levels, of the structure itself. Such a system implemented with optical strain sensors which can integrate out the deleterious effects of structural noise and with highly efficient optical multiplexing schemes has major applications in many areas. This includes the following. (1) Interior noise can be mapped in transportation vehicles—automobiles, trains, and planes—due to engine, mechanical, and flow noise mechanisms. Such a system allows the design of effective noise reduction systems. (2) Exterior radiation and scattering of acoustic energy from submarines can be predicted. Such a system allows the submarine skipper to know what signals he is sending out which could be used by an enemy sonar to detect his presence. (3) High by-pass engine noise can be monitored for aircraft exterior noise monitoring.

The above disclosure is meant to be illustrative rather than limiting. The scope of the invention is limited solely by the attached claims. Those skilled in the art who have reviewed this application will readily appreciate that other embodiments may be realized without departing from the scope of the invention. For example, the "Helmholtz"-based operator approach described herein for mapping the exterior/interior sound field can be implemented—as has been done numerically—using a large number of pressure and acoustic velocity sensors rather than strain sensors. This approach represents a trade-off in which the complication of using two types of more complicated sensors (pressure/velocity) is traded off against the need to convert the simpler line integrating strain sensor information to correct Helmholtz parameters.

What is claimed and desired to be secured by Letters Patent of the United States is:

1. A system for determining a sound level at a location in an interior or exterior fluid space of a structure, the system comprising:

sensing means for sensing a condition of the structure at a plurality of locations on the structure and for producing a plurality of outputs representing the condition at the plurality of locations; and calculating means for receiving the plurality of outputs and for calculating, on the basis of the plurality of outputs, the sound level at said location in the interior or exterior fluid space, wherein said calculating means comprises:

Fourier transform means for receiving the plurality of outputs and for producing Fourier transformed outputs from the plurality of outputs;

system solving means for receiving the Fourier transformed outputs and for calculating displacement components from the Fourier transformed outputs; and Helmholtz calculating means for receiving the displacement components and for calculating the sound level at said location in the interior or exterior fluid space from the displacement components.

2. A system as in claim 1, wherein the condition sensed by the sensing means is strain.

3. A system as in claim 1, wherein the condition sensed by the sensing means comprises pressure and acoustic velocity.

4. A system as in claim 1, wherein:

the structure has at least one high wave-number motion mode with high wave-number motions which do not contribute to the sound level at the location in the interior or exterior fluid space; and said sensing means is disposed relative to the structure so that when said calculating means calculates the sound level, components of the plurality of outputs representing the high wave-number motions average to zero.

5. A system as in claim 4, wherein:

the high wave-number motions have wavelengths smaller than $\lambda_{min}$, wherein $\lambda_{min}$ is a smallest structural wavelength occurring in a required frequency range for determining the sound level; and said sensing means comprises a plurality of sensing devices which are spaced at an interval no larger than $\lambda_{min}/8$.

6. A system as in claim 1, wherein said sensing means comprises fiber optic sensors, comprising optical fibers and means for detecting phase shifts in the optical fibers and for producing the plurality of outputs in accordance with the phase shifts.

7. A system as in claim 6, wherein said optical fibers comprise:

circumferential optical fibers which extend in a circumferential direction along the structure;

helical optical fibers which extend in a helical direction along the structure; and axial optical fibers which extend in an axial direction along the structure.

8. A system as in claim 6, wherein the optical fibers comprise circumferential optical fibers which extend in a circumferential direction along the structure.

9. A system as in claim 6, wherein the optical fibers comprise helical optical fibers which extend in a helical direction along the structure.

10. A system as in claim 6, wherein the optical fibers comprise axial optical fibers which extend in an axial direction along the structure.

11. A device for reducing a sound level at a location in an interior or exterior fluid space of a structure, the system comprising:

sensing means for sensing a first condition of the structure at a plurality of locations on the structure and for producing a plurality of outputs representing the first condition at the plurality of locations;

calculating means for receiving the plurality of outputs and for calculating, on the basis of the plurality of outputs, the sound level at said location in the interior or exterior fluid space;

control means, responsive to the sound level, for producing a control signal for converting the first condition into a second condition corresponding to a reduced sound level; and actuating means, responsive to the control signal, for changing the first condition at the plurality of locations into the second condition to reduce the sound level to the reduced sound level;

wherein said calculating means comprises:

Fourier transform means for receiving the plurality of outputs and for producing Fourier transformed outputs from the plurality of outputs;

system solving means for receiving the Fourier transformed outputs and for calculating displacement components from the Fourier transformed outputs; and Helmholtz calculating means for receiving the displacement components and for calculating the sound level at said location in the interior or exterior fluid space from the displacement components.

12. A device as in claim 11, wherein the first condition sensed by the sensing means is strain.

13. A device as in claim 11, wherein the first condition sensed by the sensing means comprises pressure and acoustic velocity.

14. A device as in claim 11, wherein:

the structure has at least one high wave-number motion mode with high wave-number motions which do not contribute to the sound level at the location in the interior or exterior fluid space; and said sensing means is disposed relative to the structure so that when said calculating means calculates the sound level, components of the plurality of outputs representing the high wave-number motions average to zero.

15. A device as in claim 14, wherein;

the high wave-number motions have wavelengths smaller than $\lambda_{min}$, wherein $\lambda_{min}$ is a smallest structural wavelength occurring in a required frequency range for determining the sound level; and said sensing means comprises a plurality of sensing devices which are spaced at an interval no larger than $\lambda_{min}/8$.

16. A device as in claim 11, wherein said sensing means comprises fiber optic sensors comprising optical fibers and means for detecting phase shifts in the optical fibers and for producing the plurality of outputs in accordance with the phase shifts.

17. A device as in claim 16, wherein said optical fibers comprise:

circumferential optical fibers which extend in a circumferential direction along the structure;

helical optical fibers which extend in a helical direction along the structure; and axial optical fibers which extend in an axial direction along the structure.

18. A device as in claim 16, wherein said optical fibers comprise circumferential optical fibers which extend in a circumferential direction along the structure.

19. A device as in claim 16, wherein the optical fibers comprise helical optical fibers which extend in a helical direction along the structure.

20. A device as in claim 16, wherein the optical fibers comprise axial optical fibers which extend in an axial direction along the structure.

21. A device as in claim 11, wherein:

the first condition has at least one non-radiating mode; and the actuating means comprises means for causing the first condition to assume the at least one non-radiating mode.

* * * * *